(12) United States Patent
Geisman

(10) Patent No.: US 6,233,992 B1
(45) Date of Patent: May 22, 2001

(54) MULTI-STATION ROTARY ENDFORM MACHINE

(75) Inventor: James L. Geisman, Horton, MI (US)

(73) Assignee: Lomar Machine & Tool Co., Horton, MI (US)

( * ) Notice: Subject to any disclaimer, the term of this patent is extended or adjusted under 35 U.S.C. 154(b) by 0 days.

(21) Appl. No.: 09/541,567

(22) Filed: Apr. 3, 2000

(51) Int. Cl.[7] ..................................................... B21B 19/00
(52) U.S. Cl. ............................ 72/94; 72/405.03; 72/421; 72/423
(58) Field of Search ................................... 72/94, 370.01, 72/370.03, 370.1, 370.11, 370.12, 370.13, 405.03, 420, 421, 423, 184, 191; 198/469.1, 470.1, 478.1, 803.3, 803.7, 803.9; 29/38 R, 38 B, 38 C

(56) References Cited

U.S. PATENT DOCUMENTS

| | | | |
|---|---|---|---|
| 4,152,566 | * | 5/1979 | Magerle .............................. 219/10.53 |
| 4,936,130 | * | 6/1990 | Kramer .................................... 72/191 |
| 5,768,931 | * | 6/1998 | Gombas .................................... 72/94 |

FOREIGN PATENT DOCUMENTS

86/06306 * 11/1986 (WO) ................................. 72/405.03

* cited by examiner

Primary Examiner—Ed Tolan
(74) Attorney, Agent, or Firm—Young & Basile, P.C.

(57) ABSTRACT

A high production multiple station endforming machine mounts a plurality of work stations upon an indexable rotary head whereby rotation of the head permits the work stations to be indexed between loading, operational and unloading positions. The workpieces are locked in jaw members operated by an over-center linkage wherein the position of the linkage is controlled by expansible chamber motors.

9 Claims, 5 Drawing Sheets

MULTI-STATION ROTARY ENDFORM MACHINE

BACKGROUND OF THE INVENTION

1. Field of the Invention

The invention pertains to multiple station endforming machines wherein work stations are indexed about an axis of rotation during operational cycles.

2. Description of the Related Art

Endforming machines are used to axially upset elongated workpieces, usually tubes, to form the end of a tube or produce an annular enlargement or diametric reduction, and may also do rolling, assembly and other secondary operations. The endforming tool engages the end of the workpiece while the workpiece is firmly held against axial displacement. Engagement of the tool with the workpiece causes the workpiece material to deform, and the workpiece holder may include configurations to receive and shape the deformed metal during displacement of the workpiece metal by the tool.

Conventional endforming machines consist of a single work station wherein the work station includes a work holder, usually in the form of jaws, for firmly gripping and positioning the workpiece prior to workpiece deformation. After the workpiece has been firmly clamped, the endforming tool is moved into engagement with the workpiece to deform the workpiece as desired. The workpiece is then removed from the work holder. Such single work station machines, while adequately shaping the workpiece by the endforming operation, are relatively low production in that each work station must be singly loaded and unloaded, and with the plurality of machine cycling, only a single part has been shaped.

Further, if secondary operations must occur on the workpiece, it must be reclamped for each operation which reduces the workpiece diameter and hardens and stresses the workpiece.

Previous attempts to increase the production of endforming machines have not been satisfactory for a number of reasons, and until the advent of the instant invention, high production endforming apparatus has not been available.

OBJECTS OF THE INVENTION

It is an object of the invention to provide an endforming machine having a high production capacity wherein the machine includes a plurality of work stations.

A further object of the invention is to provide a high production endform machine having a plurality of work stations indexing about an axis wherein various operations may be performed upon the workpiece at selected work stations and a finished workpiece is produced at each indexing.

Yet another object of the invention is to provide a multiple station endforming machine of rugged construction which is relatively economical to manufacture and wherein the workpieces may be effectively gripped and held by a linkage system, and the linkage system is operated by expansible chamber motors.

An additional object of the invention is to provide a multiple station endforming machine having a plurality of work stations indexing about an axis, and wherein tooling to perform secondary operations such as assembly procedures, rolling, threading or the like may be produced on the workpiece without reclamping thereof, and wherein it is possible to perform a number of workpiece operations prior to the workpiece being released from the endform machine.

SUMMARY OF THE INVENTION

The multiple station end forming machine in accord with the invention is mounted on a frame which supports a rotatable spindle. A circular head is mounted upon one end of the spindle consisting of a pair of spaced parallel plates, and a plurality of work stations are defined on the head between the head plates. In the disclosed embodiment, eight work stations are disclosed.

Each of the work stations includes a workpiece holder defined by a fixed jaw and a movable jaw. The workpiece holders' jaws together define a cavity complemental in configuration and size to the workpiece whereby when the jaws are closed, a workpiece is firmly gripped by the holder.

In the disclosed embodiment, one of the jaws is pivotably mounted upon the head, while the other jaw is fixed to the head. An over-center linkage operates each pivoted jaw wherein movement of the linkage to its over-center position closes the jaws of a work station to firmly lock the jaws in the closed position for gripping the workpiece. Upon the over-center linkage being shifted to a less-than-center position, the movable jaw is pivoted to an open condition releasing the workpiece.

The spindle head, and spindle, is rotatably indexed about the axis of the spindle, and such indexing is produced by an indexing motor. The endforming tool, or tools, mounted upon the frame which align with the workpiece during indexing may be operated by an expansible chamber motor.

While the over-center linkages operating the work station jaws are mounted upon the head and indexed therewith, actuating members mounted upon the frame selectively operate the over-center linkage to open or close the work station jaws. In this manner, the workpieces are gripped, or released, as desired at the appropriate position during the indexing of the head.

The frame includes a mounting sleeve having a plurality of flat mounting surfaces whereby tooling may be affixed thereto for producing the various operations at each indexed position of the head. For instance, in the disclosed embodiment wherein eight work stations are shown, the sleeve will have eight mounting surfaces for tooling.

Each indexing of the head will produce a completed workpiece upon which all of the desired operations have occurred. The average cycle time of the endform machine will be six seconds between indexes, and in the disclosed embodiment of the invention, six machining operations, in addition to loading and unloading operations, can be produced during each indexing of the head.

An endforming machine in accord with the invention may be made substantially fully automatic. By the use of known timing and cycling air or pressurized oil circuits, the operation of the endforming machine can be automated, and the high production rate achieved by a multiple station endforming machine in accord with the invention lowers the cost of forming parts by endforming.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
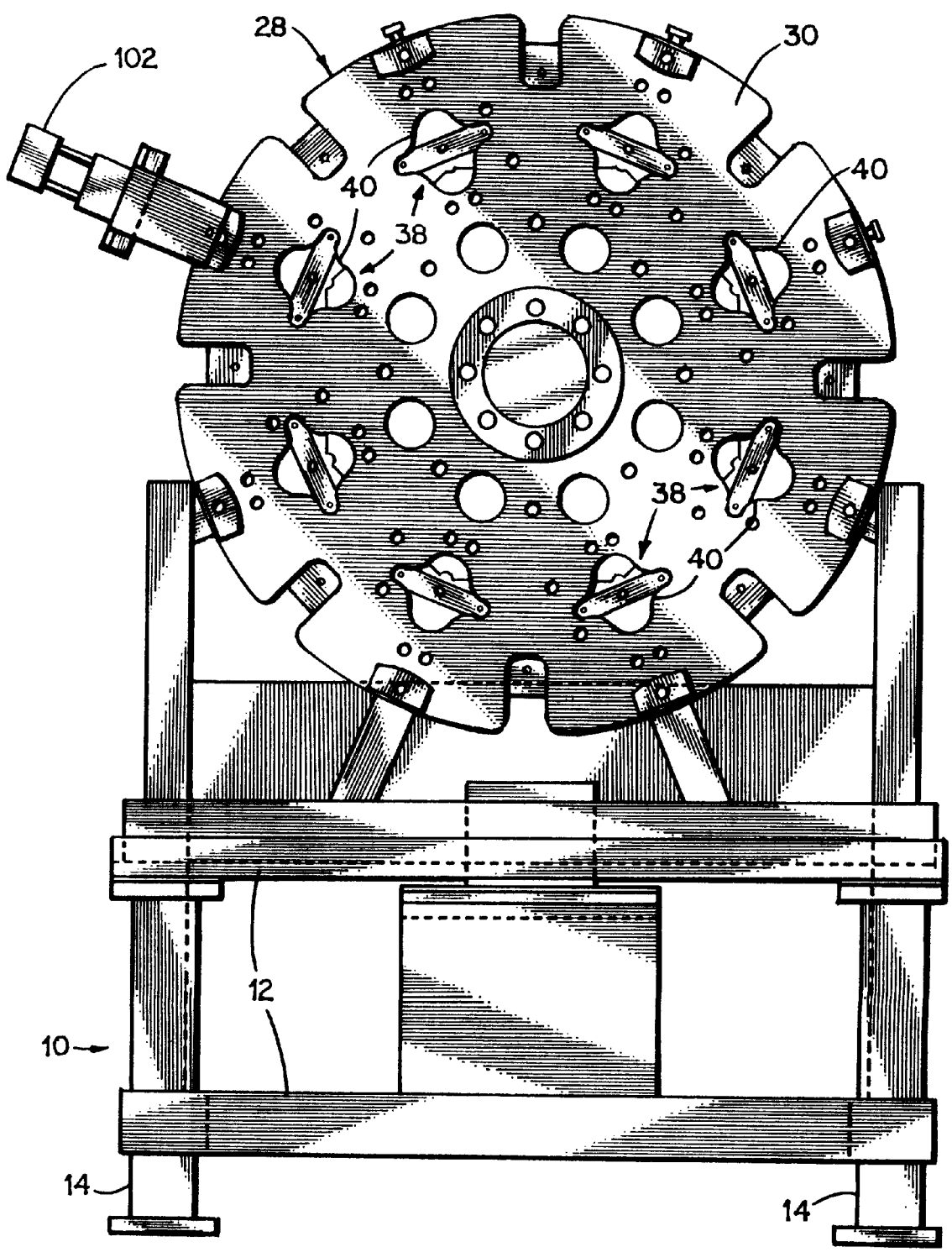
FIG. 1 is a front elevational view of a multiple station endforming machine utilizing the inventive concepts.
Figure 2:
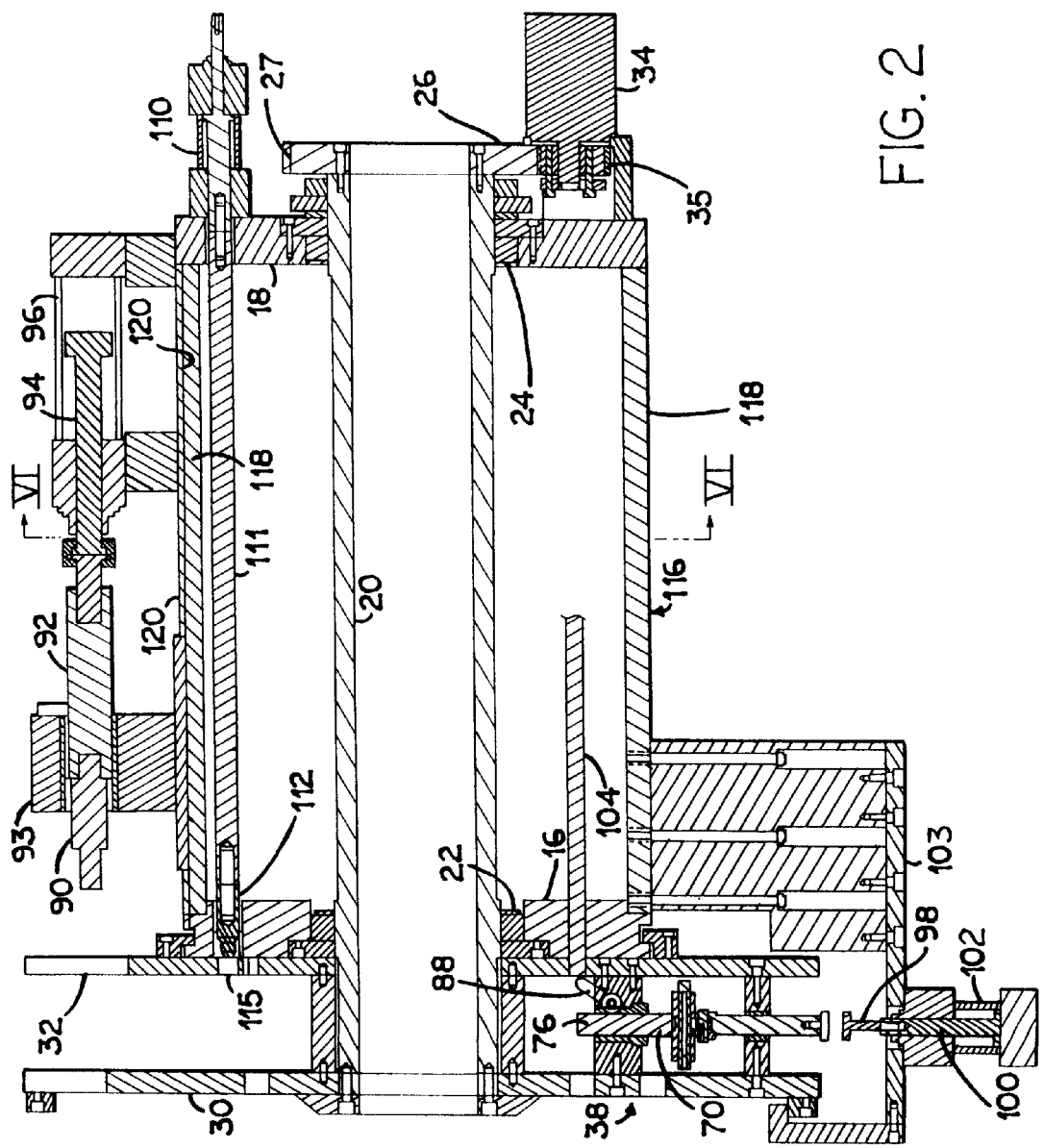
FIG. 2 is an elevational sectional view taken through the machine spindle and head taken along Section 2—2 of FIG. 6, only one work station being shown for purpose of illustration.

With reference to FIG. 1, it will be appreciated that a multiple station endforming machine in accord with the invention includes a frame generally indicated at 10 consisting of cross members 12 and columns 14 welded together to define a box-like structure which includes a front support plate 16, FIG. 2, and a rear support plate 18.

A tubular spindle 20 is rotatably mounted upon the support plates 16 and 18 by front bearings 22 and rear bearings 24. A bull gear 26 is bolted to the end of the spindle 20 having teeth 27, while the front end of the spindle extending through the bearings 22 includes a generally circular head 28 defined by an outer plate 30 and an inwardly axially spaced inner plate 32.

The spindle 20 and head 28 are rotatably indexed by an hydraulic rotary indexing motor 34 having a gear 35 meshing with bull gear teeth 27. operation of hydraulic motor 34 is by a conventional indexing motor control circuit, not shown.

A plurality of work stations 38 are defined upon the head 28 usually evenly spaced about the circumference of the head 28, and in the disclosed embodiment, FIG. 1, eight work stations 38 are defined. Each work station includes an opening 40 defined in the outer plate 30, and as will be later appreciated, the work stations 38 are formed by workpiece holding means which include a pair of jaws.

Figure 3:
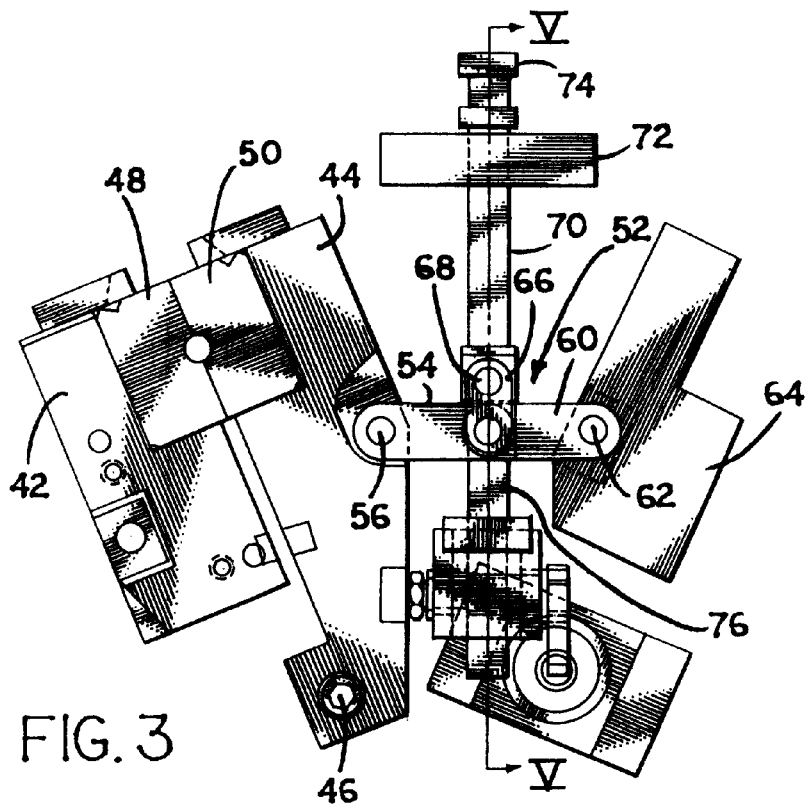
FIG. 3 is an elevational enlarged partial view of a work station illustrating the work holder jaws being maintained in the closed position by the over-center linkage.
Figure 4:
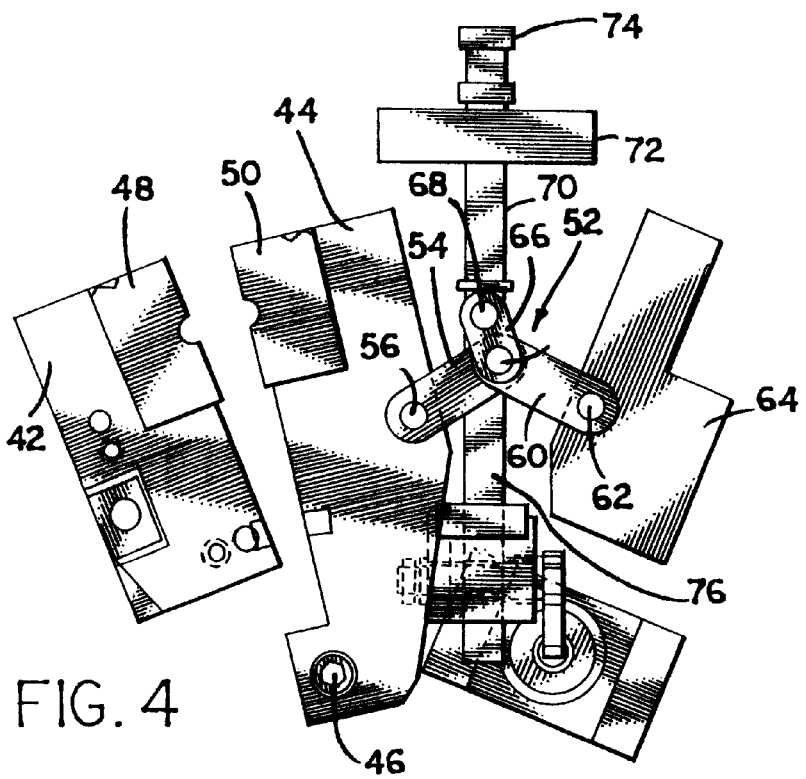
FIG. 4 is a view similar to FIG. 3, illustrating the relationship of the components when the linkage is in the open position.

The workpiece holder at the work stations 38 includes a fixed jaw 42, FIGS. 3 and 4, located between the plates 30 and 32. Also, the work holder includes a pivoted jaw 44 located within the plates 30 and 32 pivotably mounted upon the pivot pin 46. The jaw 42 includes an insert and recess 48, while the pivoted jaw 44 includes the insert and recess 50. When the jaws 42 and 44 are pivoted to the closed position shown in FIG. 3, the recesses of the inserts 48 and 50 align to define a circular opening for receiving a workpiece, not shown, therein, FIG. 3.

Opening and closing of the pivoted jaw 44 is produced by an over-center linkage generally indicated at 52. The linkage 52 includes a link 54 pivoted at 56 to the jaw 44 and also includes a pivot 58 pivotably connected to link 60 which is pivoted to the anchor 64 at 62. A small link 66 is pivotably connected to the links 54 and 60 by pivot 58, and the link 66 includes the pivot 68 connected to the axially displaceable rod 70.

Figure 5:
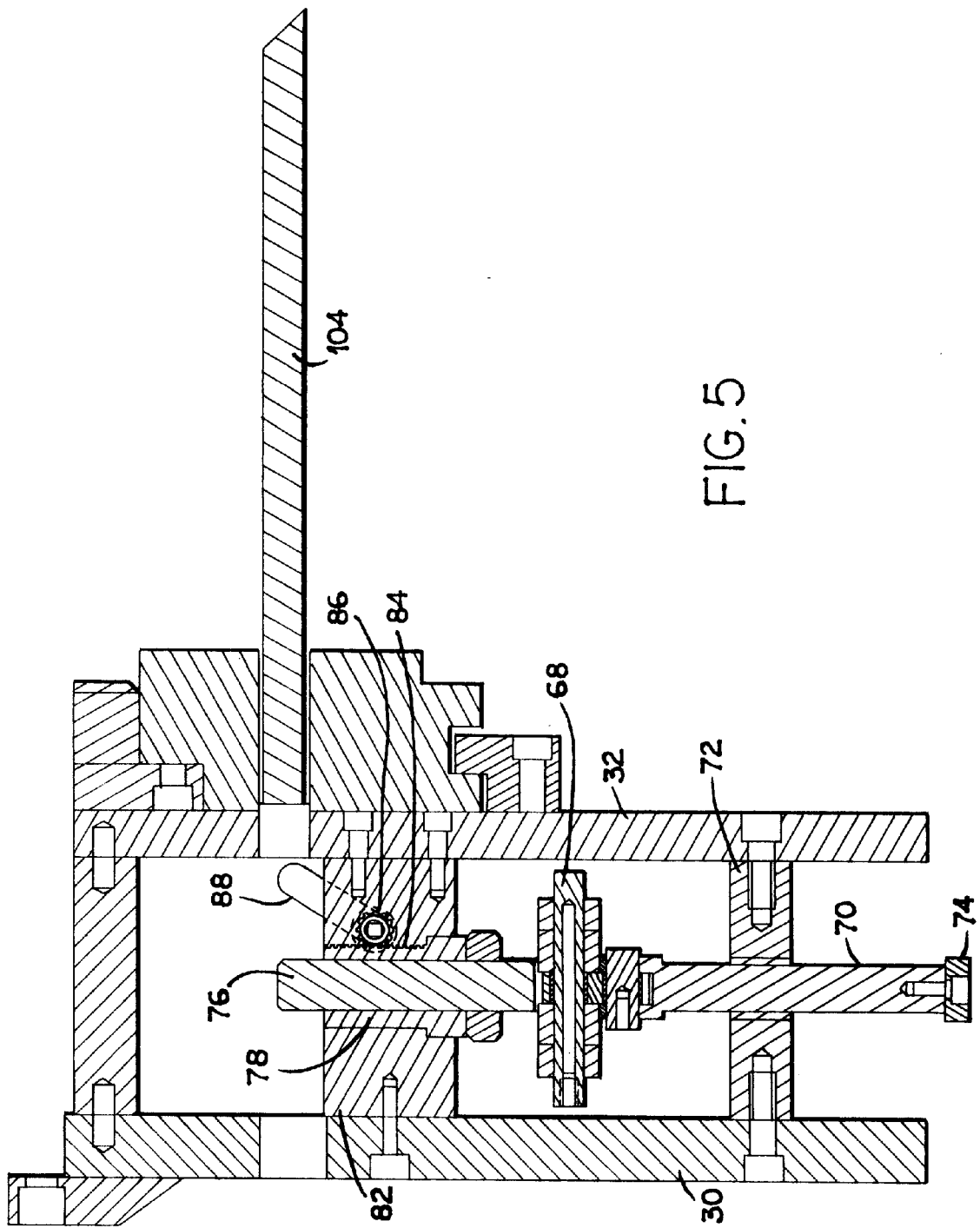
FIG. 5 is a detail view of the linkage operating mechanism illustrating the alignment of the linkage release actuator with the linkage release actuator lever.

The rod 70 is guided for generally radial movement relative to the spindle axis upon a guide 72 mounted upon the head 28, and the rod 70, at its outer end, includes a pad 74 for engagement with an expansible chamber piston extension, as later described. A rod 76 aligns with the rod 70, FIGS. 3 and 4, and the rod 76 includes a sleeve 78 upon which a nut 80 is threaded. The rod 76 and sleeve 78 is axially slidable within the guide 82 mounted between plates 30 and 32, and rack teeth 84 are defined along a portion of the sleeve 78. A tooth gear 86 is rotatably mounted upon the guide 82 and is rotated by the lever 88, FIG. 5, whose end is in alignment with an actuating expansible chamber motor as later described.

The workpiece endforming tool 90, FIG. 2, is mounted upon a tool stem 92 guided in bearing block 93 and the stem is an extension of the piston 94 of the expansible chamber motor 96. The tool 90 will align with a workpiece held within the jaws 42 and 44 when a work station 38 is indexed and held in its operative position. In this manner, movement of the piston 94 to the left, FIG. 2, causes the tool 90 to enter the end of a workpiece, not shown, axially displacing the workpiece material to form the desired configuration on the tubular workpiece, or its end, in a typical endforming operation. The block 93 and motor 96 are mounted on the frame tool drum or sleeve as later described.

Shifting of the linkage 52 to the closed position shown in FIG. 3 is accomplished by an extension 98 of the expansible chamber piston 100 of the expansible chamber motor 102 mounted on bracket 103 bolted to the tool drum, FIG. 2. The extension 98, upon movement of the piston 100 radially inwardly, will engage the pad 74 of rod 70 and move the linkage 52 to the over-center relationship shown in FIG. 3, which closes the pivoted jaw 44 relative to the fixed jaw 42 permitting the workpiece to be tightly gripped within the recesses 48 and 50.

Figure 7:
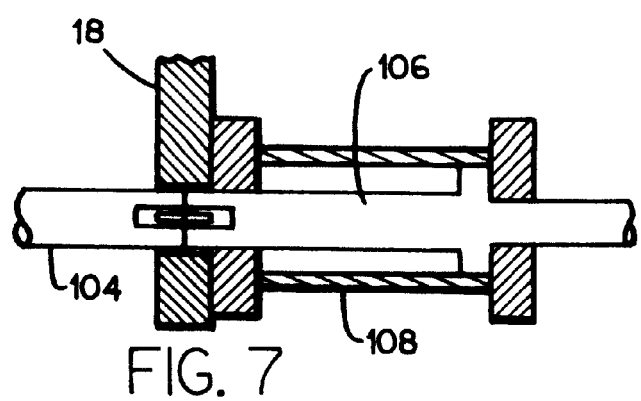
FIG. 7 is a detail elevational view of the clamp release expansible chamber motor.

When it is desired to open or unlock the linkage 52 to pivot the jaw 44 to the open position shown in FIG. 4, the piston extension 104, FIG. 2, is moved to the left, FIG. 2, by the piston 106 of the expansible chamber motor 108 mounted on the frame rear support 18, FIG. 7. Movement of the extension 104 to the left, FIG. 2, causes the end of the extension 104 to engage the gear lever 88 rotating the gear 86 which axially translates the sleeve 78 and moves the rod 76 radially outwardly with respect to the spindle axis. Such movement of the rod 76 outwardly, through the pivot pin 68 and linkage 66, causes the links 54 and 60 to collapse as shown in FIG. 4 breaking the "over-center" relationship of these links and pivoting the jaw 44 to the open position shown in FIG. 4.

To insure that the head 28 will be firmly locked against rotation while the workpiece is being worked upon when held within the jaws 42 and 44, an expansible chamber motor 110 includes a piston extension 111 which moves the guided detent 112 into a hole 115 defined in the head inner plate 32. The detent 112 is closely received within the bushed holes 115 to prevent rotation of the head 28 while work is occurring at the work stations 38.

An octagonal tool drum or sleeve 116 is mounted upon the frame 10 between the front support 16 and rear support 18 as will be appreciated from FIG. 2. The octagonal configuration of the tool drum 116 is best appreciated from FIG. 6 wherein it will be appreciated that the tool sleeve is formed by a plurality of plates 118. The tool sleeve 116 is of an octagonal configuration because, in the disclosed embodiment, eight work stations 38 are disclosed. If an end forming machine in accord with the invention is provided with six work stations, the tool sleeve will be of a hexagonal configuration, the number of plates 118 conforming to the number of work stations. Because the tool sleeve 116 is mounted upon the frame front and rear supports, the tool sleeve is stationary and the head 28 will index relative to the drum sleeve.

Figure 6:
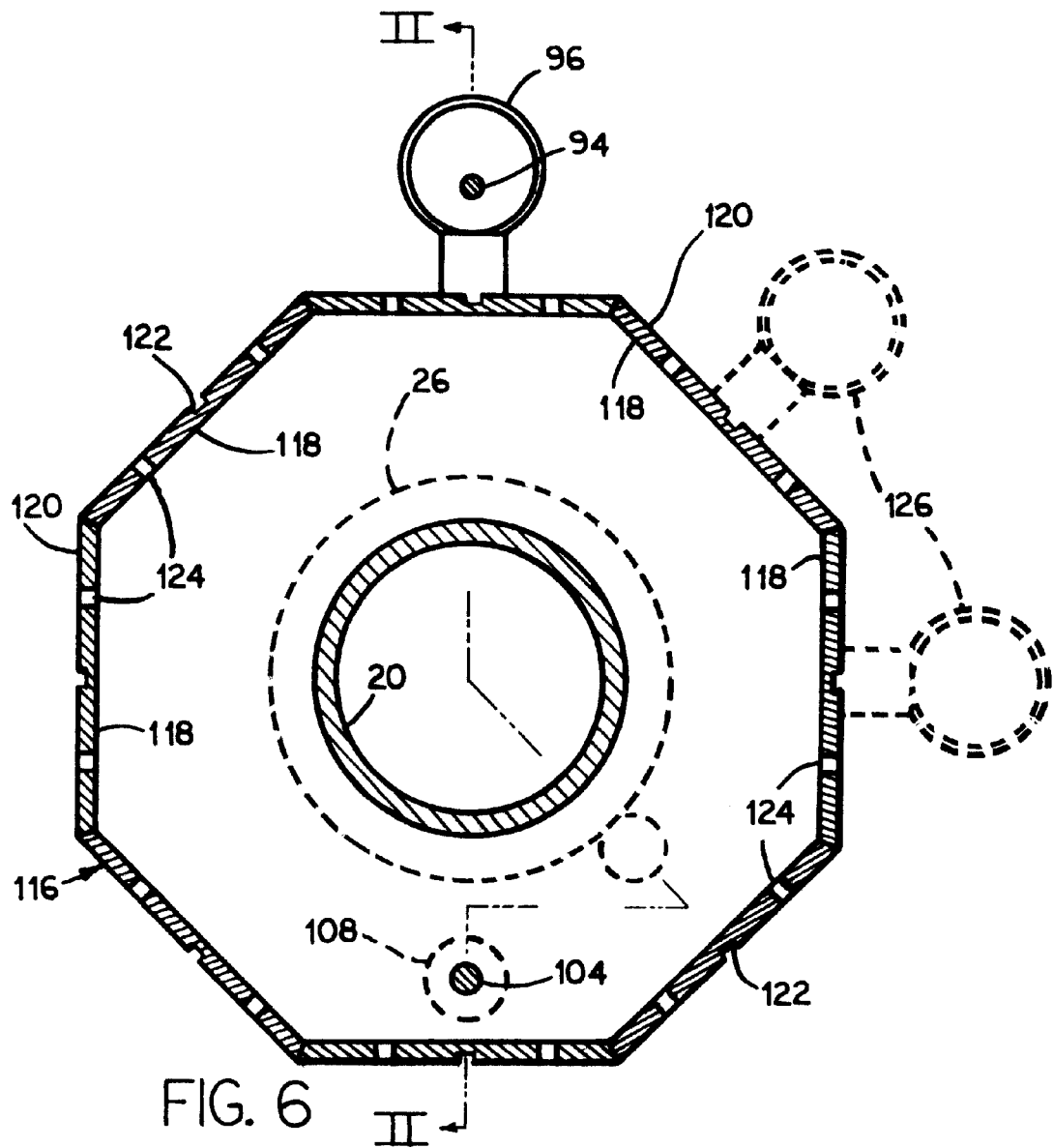
FIG. 6 is an elevational view taken along Section 6—6 of FIG. 2.

The purpose of the tool sleeve or drum 116 is for the purpose of mounting tools and machine operating components thereon. In this respect, the outer surfaces 120 of the plates 118 are axially notched at 122 in order to receive the keys of tools mounted on the plates 118, and holes 124 may be threaded to receive bolts used to mount tools upon the plates. As shown in FIG. 6, tools 126, such as shown in dotted lines, may represent assembly tooling, rolling or threading tools, or the like. In this manner, the workpiece will be presented in alignment with appropriate tooling mounted upon the tool drum 116 as the head mounted workpiece is indexed for alignment with tools mounted upon the tool drum.

The tool drum also supports the endforming tool bearing block 93, and the expansible chamber motor 96 and the bracket 103 is also bolted to the tool drum.

From the above description, it will be appreciated that as the head 28 is indexed about the axis of the spindle 20, the work stations will be sequentially in alignment with the endforming tool 90, and with any tooling mounted upon the tool drum 116. As the endforming machine disclosed will permit a number of sequential operations to be formed on the endformed part prior to the workpiece being unclamped, each indexing of the head 28 will permit a finished workpiece to be released from its associated work station 38, resulting in a high production rate.

One of the advantages of an endforming machine in accord with the inventive concepts is that it is only necessary to grip the workpiece once even though a plurality of diverse operations may be imposed upon the workpiece. In known endforming machines, it is necessary to release the workpiece after the endforming operation and re-grip the workpiece during each sequential secondary operation. With the invention, the workpiece only need be gripped or clamped once, and the secondary operations after endforming are completed before the workpiece is released from the machine. As sequential clamping and unclamping of tubular workpieces causes the workpieces to be slightly compressed, causing work hardening and stress of the workpiece, significant quality control advantages are achieved by the machine of the invention.

It is appreciated that various modifications to the inventive concepts may be apparent to those skilled in the art without departing from the spirit and scope of the invention.

What is claimed is:

1. A multiple station endform machine comprising, in combination, a frame, a rotatable spindle mounted upon said frame having an axis of rotation, indexing means for rotatably indexing said spindle about said axis, a head mounted on said spindle for rotation therewith, a plurality of work stations defined on said head, a workpiece holder located at each work station operable between open and closed positions, at least one elongated forming tool mounted on said frame having a tool axis, forming tool motor means operably connected to said forming tool selectively axially displacing said tool along said tool axis, said tool axis aligning with a work station and workpiece holder at selected indexed positions of said spindle and head, a first motor mounted on said frame selectively shifting said workpiece holder from said open position to said closed position, and a second motor mounted on said frame selectively shifting said workpiece holder from said closed position to said open position.

2. In a multiple station endform machine as in claim 1, said workpiece holders comprising first and second jaws, said second jaw being movable with respect to said first jaw between said open and closed positions, second jaw operating means affixed to said second jaw, said first and second motors being operatively selectively connected to said second jaw operating means.

3. In a multiple station endform machine as in claim 2, said second jaw operating means comprising an over-center linkage having an over-center locked position positioning said second jaw in said closed position and a less-than-center position positioning said second jaw in said open position, said first motor changing said linkage from said less-than-center position to said over-center position and said second motor changing said linkage from said over-center position to said less-than-center position.

4. In a multiple station endform machine as in claim 3, said forming motor means and first and second motors comprising fluid expansion chamber motors each having a piston, said forming tool being connected to said forming motor means piston, said first motor piston having a first extension selectively engaging said over-center linkage for shifting said linkage to said over-center locking position, said second motor piston having a second extension selectively engaging an actuator to engage and position said over-center linkage from said over-center locking position to said less-than-center open position.

5. In a multiple station endform machine as in claim 4, said actuator comprising a toothed rack mounted on said head having a selective direction of axial movement toward and away from said over-center linkage, a toothed gear meshing with said rack rotatably mounted on said head having an operator lever for rotating said gear, said second extension selectively engaging said lever to rotate said gear and translate said rack to shift said over-center linkage to said open less-than-center position.

6. In a multiple station endform machine as in claim 3, said second jaw being pivotably mounted on said head and said first jaw being fixed upon said head.

7. A multiple station endform machine comprising, in combination, a frame, a rotatable spindle mounted upon said frame having an axis of rotation, indexing means for rotatably indexing said spindle about said axis, a head mounted on said spindle for rotation therewith, a plurality of work stations defined on said head, a workpiece holder located at each work station operable between open and closed positions, at least one elongated forming tool mounted on said frame having a tool axis, forming tool motor means operable connected to said forming tool selectively axially displacing said tool along said tool axis, said tool axis aligning with a work station and workpiece holder at selected indexed positions of said spindle and head, a first motor mounted on said frame selectively shifting said workpiece holder from said open position to said closed position, a second motor mounted on said frame selectively shifting said workpiece holder from said closed position to said open position, a tool drum mounted upon said frame coaxial with said spindle axis of rotation, tool mounting surfaces defined on said tool drum, said forming tool and said forming tool motor means being mounted upon said tool drum.

8. In a multiple station endform machine as in claim 7, said tool drum being of a tubular configuration having a plurality of flat exterior tool mounting surfaces defined thereon, the number of tool mounting surfaces defined on said tool drum corresponding in number to the number of work stations defined on said head, and tool mounting means defined upon each of said tool drum surfaces.

9. In a multiple station endform machine as in claim 8, said tool mounting means defined on said tool drum surfaces comprising key receiving grooves, and threaded holes for receiving threaded fasteners for attaching tools to said tool supporting surfaces.

* * * * *